United States Patent

[11] 3,571,592

| [72] | Inventor | Alastair M. Glass<br>Murray Hill, N.J. |
|---|---|---|
| [21] | Appl. No. | 749,354 |
| [22] | Filed | Aug. 1, 1968 |
| [45] | Patented | Mar. 23, 1971 |
| [73] | Assignee | Bell Telephone Laboratories, Incorporated<br>Murray Hill, Berkeley Heights, |

[54] PYROELECTRIC DEVICES OF HIGH ACOUSTIC LOSS SHOWING INCREASED FREQUENCY RESPONSE
5 Claims, 2 Drawing Figs.

[52] U.S. Cl. ..................................................... 250/83,
 73/356, 250/83.3
[51] Int. Cl. .................................................... G01k 7/02,
 H01j 39/00
[50] Field of Search ........................................ 250/83,
 83.3 (IR); 73/356

[56] References Cited
UNITED STATES PATENTS
3,453,432 7/1969 McHenry ..................... 250/83.3IR Primary Examiner—James W. Lawrence
Assistant Examiner—Morton J. Frome
Attorneys—R. J. Guenther and Edwin B. Cave ABSTRACT: A class of materials exemplified by mixed crystals of barium niobate and strontium niobate acts as a radiation detector by reason of the change in polarization resulting from the heating produced by an incident beam. This pyroelectric response is sufficiently rapid for infrared radiation that a pulse train well in excess of a megabit per second may be followed for incident beam power well below 1 watt.

PATENTED MAR 23 1971 3,571,592

INVENTOR
A.M. GLASS
BY
George S. Indig
ATTORNEY

PYROELECTRIC DEVICES OF HIGH ACOUSTIC LOSS SHOWING INCREASED FREQUENCY RESPONSE

BACKGROUND OF THE INVENTION

1. Field of the Invention

The invention is concerned with detectors of electromagnetic radiation operating on a pyroelectric principle. Exemplary devices show a frequency response of many megahertz to an incident beam with infrared carrier frequencies at a power level of less than a watt.

2. Description of the Prior Art

The detection of infrared electromagnetic radiation, that is radiation having a wavelength above about 7,000 angstrom units, has always been somewhat more difficult than the detection of shorter wavelength radiation. Common techniques involve the conversion of such energy to heat energy which then results in a physical change in some selected material due simply to a rise in temperature. An example is the Golay cell which measures the expansion of a confined body of gas so arranged as to absorb the infrared energy.

It is clear that use of such heating effects result in detectors which are limited both in their frequency response and in their sensitivity. While improvements over the years have resulted in devices which may sense power levels as low as $3\times10^{17}$ milliwatts c.p.s.$^{1\!/\!2}$ typical modulation frequency response permits detection at frequencies no higher than of the order of a few kilohertz.

The deficiency in infrared detectors has been emphasized by the development of the laser. Most lasers and all CW lasers operate at infrared or near-infrared frequencies. As an example, neodymium-doped yttrium aluminum garnet, at this time the most promising solid-state laser, characteristically operates at 10,640 angstrom units.

Communication engineers naturally consider coherent radiation produced by laser oscillation to represent a further extension of the available usable carrier frequencies. Much study has been directed to the development of the various circuit elements such as modulators, oscillators, etc., required in such a communication system. The advantage of utilizing the higher frequency carriers now made available is enhanced bandwidth. Modulators and certain other circuit elements have already been operated at frequencies approaching a gigahertz, and there is consequently some promise that large bandwidth laser carrier systems will be developed.

A major lacking in such a communication system is the detector. A usable detector must be capable of operating at the same order of frequency of the other circuit elements. The only structures reported with such frequency capability at infrared frequencies operate at very low temperature (liquid helium). The best known of these devices is copper-doped germanium. A need exists for an infrared detector capable of high frequency operation and useful at normal operating temperatures.

Some study has been directed to a class of detectors operative at liquid nitrogen and higher temperatures dependent upon the pyroelectric voltage due to the change in polarization resulting from the heat developed by the absorption of infrared. From the published literature, it appears that the best of these devices utilizes triglycene sulfate, see Vol. 6, "Japanese Journal of Applied Physics," p.120 (1967). The frequency response of the best of these devices, however, is no greater than 10 or 100 kilohertz.

It is evident that the responsivity of a pyroelectric detector is determined by the change in polarization with temperature $dP_s/dT$ and, under some circumstances, also be electronic conductivity. The intuitive assumption that such devices will not operate efficiently at high frequencies is supported by the measured values of $dP_s/dT$. Materials studied by prior workers give no substantial promise of operation at frequencies above 100 kilohertz at feasible power levels.

The lack of activity in the field of pyroelectric techniques is probably in part due to another limitation in frequency operation. In the Journal of Applied Physics article cited above, it is noted that high frequency operation was precluded by the piezoelectric oscillation which set in at about 10 kilohertz. In fact, the largest $dP_s/dT$ s/dT materials, at least thus far, have been ferroelectric and have been used below their Curie points. All such materials are, therefore, expected to be strongly piezoelectric. The local heating produced by absorption of the beam naturally results in volume oscillation of the crystal which necessarily produces an accompanying piezoelectric oscillation. The lowest fundamental mode, therefore, becomes the maximum frequency at which the device is usable. This frequency which is in turn dependent upon crystal configuration, is expected to occur well below a megahertz for device-dimension crystal sections.

SUMMARY OF THE INVENTION

It has now been discovered that the principle of pyroelectric detection of electromagnetic radiation may be extended well into the frequency range above 1 megahertz. Studies have been carried out in the exemplary class of ferroelectric materials $Ba_xSr_{1-x}Nb_2O_6$ in which $x$ is from 0.25 to 0.75. Superiority of these materials is attributed basically to a high value of $dP_s/dT$ and to the absence of crystal resonance due to piezoelectric oscillation brought about by the periodic lattice expansion responsive to the radiation-produced temperature variation. The latter is believed attributable to very high acoustic loss (at least 5 db. per centimeter at 100 megahertz) which from the practical standpoint precludes any observable piezoelectric effect.

DETAILED DESCRIPTION

Figure 1:
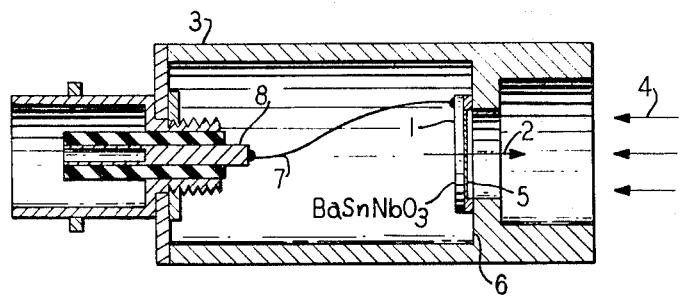
FIG. 1 is a cross-sectional view of an illustrative form of detector in accordance with the invention.

The device of FIG. 1 consists of pyroelectric detector 1 with its polar axis indicated by arrow 2. The crystal is mounted within housing 3 so arranged as to accept radiation 4 as shown. For the configuration shown, the face of crystal 1, upon which radiation is incident, is blackened, for example, with a coating 5 of vaporized gold. Opaque coatings are usefully applied where the radiation to be detected has a wavelength of about 10 microns or less. At longer wavelengths, materials such as the barium strontium niobate compositions are sufficiently absorbing that an absorbing coating is not required. Electrical contact is made to opposite flat surfaces of crystal 1 by means of electrodes 6 and 7, 6 being grounded to housing 3, and 7 being electrically attached to central coaxial connector 8. The structure shown in FIG. 1 was utilized experimentally for producing some of the results reported in this description.

Figure 2:
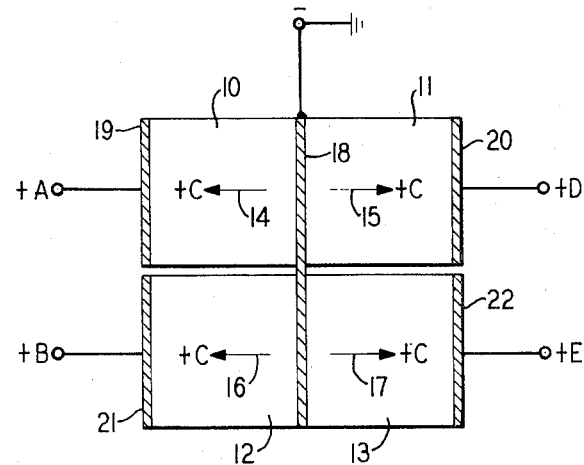
FIG. 2 is a plane view partly in section of a mosaic of detectors useful, for example, for image reproduction and beam positioning.

The device of FIG. 2 is a simple mosaic useful, for example, in detecting and centering a pulsed or otherwise modulated infrared beam. Positioning of the coherent laser output is a problem to which such a device may be applied. The mosaic shown is made up of four pyroelectric crystalline sections 10, 11, 12 and 13. Polar axes are all parallel as indicated graphically by arrows 14, 15, 16 and 17. Polarity is, however, reversed within each of the pairs of elements 10—11 and 12—13 as also indicated. Edge electrical connections are made through common electrode 18 together with individual electrodes 19, 20, 21 and 22. While the device may be used, for simple intensity measurements by typing electrodes 19 through 22 together, it may be used for beam positioning by taking advantage of the opposite polarizations of the members of either or both of the two pairs of elements. Since the direction of the momentary voltage developed at, for example, 19 and 20 is opposite for a given direction of temperature change, these voltages will exactly balance only when the temperature change in elements 10 and 11 is identical. This, in turn, occurs for a beam position such that the area of incidence of the beam is equally divided. Positioning can, therefore, be accomplished for use as a null-reading device. Simultaneous y-positioning may be accomplished by connecting 19 and 21 and/or 20 and 22 to opposite terminals of a differential amplifier.

GENERAL DEVICE DESIGN CONSIDERATIONS

Devices of this invention rely on the change of spontaneous polarization $P_s$ with temperature. To avoid partial cancellation of the developed signal, single domain material is therefore desirable. Fortunately, the class of materials which serves as a basis for this invention is ferroelectric and saturation may be accomplished by usual ferroelectric poling. As is well known, this simply calls for application of an electric field of a magnitude which may be reduced to small proportions by increasing the temperature of the crystalline material to values approaching the ferroelectric Curie point. A common procedure is to raise the material to or above its Curie point and to permit it to cool through its transition while applying an electric field.

Greatest efficiency of utilization of the developed voltage is obtained by use of poled single crystals. As will be discussed, however, optimization of device design places a premium on decreasing thickness of the pyroelectric medium. In the ultimate, this consideration dictates a preference for extremely thin bodies which are produced only by use of supporting structures. Such coatings may be prepared by deposition; and while they may conceivably be epitaxially grown on single crystal or amorphous substrates, polycrystalline layers, which may more easily be produced, without regard to substrate orientation and substrate lattice parameters, are quite useful when poled.

The voltage $\Delta V$ developed by an inventive detector is of the magnitude:

$$\Delta V = AR \frac{dP_s}{dT} \qquad \text{eq. 1}$$

where $A$ is the area of the electrode normal to the polarization axis direction, $R$ is the resistance of load across which the signal is developed, $dP_s/dT$ is the pyroelectric coefficient and all quantities are in compatible units.

Eq. 1 is applicable providing that the modulation frequency, $\omega$, $(2\pi f)$ is less than the RC time constant of the combined crystal-load circuit and that $R$ is less than the leakage resistance $R'$ of the pyroelectric material. The desirable range of composition within the barium strontium niobate system has been indicated. While the limits on $x$ are generally of interest, they were selected largely on the basis of desired operating temperature. These limits may be exceeded, the requirement being that the composition retain its substantially tetragonal, tungsten bronze structure since it is for this crystalline structure that the large pyroelectric coefficients are evidenced.

Within the barium strontium niobate series, increasing amount of barium results in increasing ferroelectric Curie temperature. Since the pyroelectric coefficient increases as the Curie temperature is approached, particular operating temperatures may suggest different operating temperatures within this series for maximum operating sensitivity. Experiments have been conducted on barium strontium niobate materials having Curie temperatures of from 313° K. to 378° K. Pyroelectric coefficients at 300° K. for these materials vary from 0.31 to 0.06 in units of microcoulombs per square centimeter per degree K. These particular samples, in turn, had a composition in accordance with the formula in which $x$ was about 0.25 to about 0.5. By comparison, the best previously reported pyroelectric material, triglycene sulfate, has a pyroelectric coefficient of about 0.02 to 300° K.

The following designing considerations are discussed in accordance with an actual example set forth.

EXAMPLE

A detector was constructed from barium strontium niobate having an $x$ value in the formula of about a 0.33 and a Curie point of about 333° K. The 300° K. pyroelectric coefficient was 0.11 in the units noted above. A section having an area of 0.05 sq. cm. and a thickness of 0.01 centimeter was cut from a poled single crystal in such direction that the polar or $c$ axis was normal to the plane of the wafer. Gold electrodes were electrodeposited on the wafer faces and a thin gold-black was evaporated over the electrode on the face which was to be exposed to radiation. The crystal wafer was placed in an apparatus of the design shown in FIG. 1. The blackened surface was irradiated with $10.6\mu$ (micron) radiation from a Q-switched $CO_2$ laser. The input impedance of the signal amplifier was 50 ohms and the RC time constant of the detector circuit was less than $10^{18}$ seconds. The pulse train from the Q-switched laser was at a rate of 100 megabits per second. The detector response showed a rise time of less than 30 nanoseconds and the pulse train was resolved. Operation was at about 300° K., that is at room temperature.

The experiment of the example was not optimized for responsivity or signal-to-noise ratio. Optimum conditions are now discussed. Responsivity of a pyroelectric detector, which may be measured in terms of the voltage developed across a load per watt of incident beam power, is directly proportional to the effective area of the pyroelectric element and is inversely proportional to functions of the amplifier input capacitance (including the pyroelectric element capacitance) and to the thermal capacity and thermal conductance of the pyroelectric element. For barium strontium niobate with $x$ equal to about 0.33, for a detector area of 1 square centimeter and a thickness of $2\times10^{13}$ cm., and with face electrodes, the responsivity of 1cycle per second is about 50 volts per watt. With electrodes on the wafer edges, the responsivity if about 25,000 volts per watt. With this last configuration, responsivity increases inversely as the crystal thickness.

The responsivity of the pyroelectric medium goes down with increasing modulated frequency. Exemplary values of minimum detectable power for base-band operation $W_{m_\omega}$ (bandwidth equal to modulated frequency) and minimum detectable power for 1 cycle per second bandwidth ($W_{m_1}$) are set forth.

| Modulated frequency in Hertz | $W_{m_\omega}$ | $W_{m_1}$ |
|---|---|---|
| $10^6$ | $1.5\times10^{-4}$ | $3.6\times10^{-7}$ |
| $10^7$ | $4.5\times10^{-3}$ | $3.6\times10^{-6}$ |
| $10^8$ | $1.5\times10^{-1}$ | $3.6\times10^{-5}$ |
| $10^9$ | $4.5$ | $3.6\times10^{-4}$ |

The values set forth in the table are based on measured AC conductivity values for the specified compositions and for actual amplifier noise levels for base-band operation in a typical triode amplifier. Minimum detectable power for an ideal configuration at 1 c.p.s. and for a pyroelectric element thickness greater than 20 microns is about $4\times10^{19}$ watts per centimeter per c.p.s.$^{1 1/2}$. Minimum detectable power may be further reduced for thinner pyroelectric elements such as may be produced by deposition on a supporting substrate. The detector results set forth above are about two orders of magnitude faster in response than for other pyroelectric detectors. The most striking observation is the apparent freedom from piezoelectric oscillations which have limited the best previously reported pyroelectric detector (trigylcene sulfate). It has been observed that the materials within the barium strontium niobate system have sufficient acoustic loss to prevent detection of piezoelectric response with usual apparatus. This acoustic loss, therefore, probably represents the most significant departure from earlier devices. Absence of piezoelectric resonance theoretically permits operation up to the frequency limit of about $10^{11}$ cycles per second where the polarization fluctuations are of the same order of magnitude as the polarization itself.

The fact that the detectors of this invention depend upon rate of change of temperature and not on temperature itself permits rapid change since the response does not depend on the pyroelectric medium reaching thermal equilibrium with the radiation. This mechanism, however, necessarily indicates a distortion of the detected signal. Also, maximizing $dP_s/dT$ by operating near the Curie temperature, while increasing sensitivity, necessarily results in nonlinear operation. These various considerations suggest that application of the invention detector to linear systems will introduce circuit complications. While these various causes of nonlinearity may be compensated, it appears that communication use will, in all probability, take the form of PCM (pulse code modulation).

To convert the minimum power figures set forth in the table into meaningful terms for PCM operation, it is necessary to make certain assumptions. Communication engineers consider 32 sampling levels to give adequate video or other signal definition for many purposes. For digital operation this requires five pulses ($2^5=32$). Since characterization of a cycle requires two bits, the frequency bandwidth indicated on the table is 5×2 or one order of magnitude greater than the equivalent linear bandwidth.

The invention has been described in terms of a limited number of embodiments. Materials discussed are generally within the barium strontium niobate system and, indeed, use of these represent a preferred aspect of the invention. However, the observation that pyroelectric detectors may operate with frequency bandwidths of greater than a megahertz represents a general departure from the prior art, and the invention may be described in such general terms. Materials required to result in such frequency response should have a pyroelectric coefficient at least about 0.01 microcoulombs per square centimeter per degree K. and, at least as important, must have sufficient acoustic loss to preclude piezoelectric oscillation. It is, of course, a requirement that the material be ferroelectric, and it is observed that for many materials the required nominal values of pyroelectric coefficients are obtained only for operation within about 50° K. of the Curie point.

As to detector design and operation, many variations are possible. It has been observed that the detectors of the invention are unique in their room temperature response. However, selection of materials having appropriate Curie temperatures so as to permit low temperature operation may result in still further increased responsivity. Certain compositions of the potassium tantalate-niobate system are considered promising for such operation.

The devices have been discussed largely in terms of detectors. Their uses, however, are far more general. A beam locator has been described in conjunction with FIG. 2. Other uses include switches and memory devices in general. Memory devices may take many forms. One particularly promising design utilizes Curie point writing, that is, switching is accomplished locally in regions heated, for example, by a laser beam by use of electric field values too small to accomplish switching at the operating temperature. Readout again takes advantage of the polarity of the voltage developed responsive to a small temperature change.

Devices of this invention are usefully operated at carrier wavelengths over the entire infrared range. Most comments in the description are applicable to the wavelength range of from about 0.7 micron to about 140 microns. Beyond 140 microns the photoconductive mechanism used, for example, in the low temperature germanium-copper detector is no longer operative. Pyroelectric devices of this invention operate well beyond 140 microns to wavelengths in the range of a few millimeters.

I claim:

1. Apparatus including a pyroelectric detector comprising a substantially single domain body of ferroelectric material provided with electrodes for sensing a voltage developed due to a change in temperature caused by incident infrared radiation characterized in that the said body consists essentially of a material having a pyroelectric coefficient of at least 0.01 microcoulombs per square centimeter per degree K., the said body having an acoustic loss of at least 5 db. per centimeter at a frequency of 100 megahertz.

2. Apparatus of claim 1 in which the said body is a ferroelectric material with a Curie point which is a maximum of 50° C. higher than the operating temperature.

3. Apparatus of claim 1 in which the said body consists essentially of a composition which may be represented by the formula $Sr_{1-x}Ba_xNb_2O_6$ in which $x$ equals from 0.25 to 0.75.

4. Apparatus of claim 4 in which the polar direction of the said body is substantially parallel to the intended incident radiation and in which the electrodes are so arranged as to measure the polarity developed in the transmission direction.

5. Apparatus of claim 4 in which the said body is a wafer with the small dimension in the transmission direction and in which electrodes are placed at two opposing edges of the said body.